(12) United States Patent
Zheng et al.

(10) Patent No.: US 12,408,596 B2
(45) Date of Patent: Sep. 9, 2025

(54) PRECISE LIGHT SUPPLEMENT DEVICE FOR KIWIFRUITS

(71) Applicants: Institute of Urban Agriculture, Chinese Academy of Agricultural Sciences, Chengdu (CN); Chengdu Agricultural Science and Technology Center, Chengdu (CN)

(72) Inventors: Yinjian Zheng, Chengdu (CN); Pengpeng Mao, Chengdu (CN)

(73) Assignees: Institute of Urban Agriculture, Chinese Academy of Agricultural Sciences, Chengdu (CN); Chengdu Agricultural Science and Technology Center, Chengdu (CN)

( * ) Notice: Subject to any disclaimer, the term of this patent is extended or adjusted under 35 U.S.C. 154(b) by 0 days.

(21) Appl. No.: 18/889,815

(22) Filed: Sep. 19, 2024

(65) Prior Publication Data
US 2025/0089631 A1    Mar. 20, 2025

(30) Foreign Application Priority Data

Sep. 20, 2023  (CN) .......................... 202311213294.1

(51) Int. Cl.
*A01G 9/24* (2006.01)
*A01G 22/05* (2018.01)

(52) U.S. Cl.
CPC ............. *A01G 9/249* (2019.05); *A01G 22/05* (2018.02)

(58) Field of Classification Search
CPC .......... A01G 9/249; A01G 22/05; F21V 21/30
See application file for complete search history.

(56) References Cited

U.S. PATENT DOCUMENTS

| | | | | |
|---|---|---|---|---|
| 2,097,537 | A * | 11/1937 | Snyder | F21V 21/15 362/426 |
| 4,729,071 | A * | 3/1988 | Solomon | F21V 21/30 359/220.1 |
| 9,476,576 | B2 * | 10/2016 | Chen | F21V 23/00 |
| 10,299,442 | B2 * | 5/2019 | Vesty | A01G 9/249 |
| 10,473,311 | B2 * | 11/2019 | Fujisawa | F21V 14/02 |
| 10,830,423 | B2 * | 11/2020 | Fujisawa | F21V 21/30 |
| 11,009,219 | B2 * | 5/2021 | Fujisawa | F21S 4/20 |
| 11,231,141 | B2 * | 1/2022 | Fujisawa | F16M 13/022 |
| 11,767,968 | B2 * | 9/2023 | Lin | F21V 14/04 362/59 |
| 2012/0047801 | A1* | 3/2012 | Hogan | A01G 9/022 47/65.5 |
| 2016/0360711 | A1* | 12/2016 | Vesty | A01G 31/047 |
| 2025/0089631 | A1* | 3/2025 | Zheng | A01G 9/249 |

FOREIGN PATENT DOCUMENTS

CN          209371079 U        9/2019

* cited by examiner

*Primary Examiner* — Monica L Perry
(74) *Attorney, Agent, or Firm* — Pilloff Passino & Cosenza LLP; Rachel Pilloff; Sean Pilloff (57) ABSTRACT

A precise light supplement device for kiwifruits is provided, relating to the field of kiwifruit planting. The device includes a support table and a light supplement lamp body. An angle adjusting mechanism is mounted on a top of the support table, and a top of the angle adjusting mechanism is connected to a bottom of the light supplement lamp body. A fixing frame is fixedly mounted on a top of the light supplement lamp body, a mounting plate is fixedly connected to one side of the fixing frame, and a movable mechanism is arranged at one side of the light supplement lamp body.

10 Claims, 7 Drawing Sheets

PRECISE LIGHT SUPPLEMENT DEVICE FOR KIWIFRUITS

CROSS-REFERENCE TO RELATED APPLICATIONS

The disclosure claims priority to Chinese Patent Application No. 202311213294.1, filed on Sep. 20, 2023, the contents of which are hereby incorporated by reference.

TECHNICAL FIELD

The disclosure relates to the technical field of kiwifruit planting, and in particular to a precise light supplement device for kiwifruits.

BACKGROUND

Kiwifruit, a woody perennial plant of the genus Kiwifruit in the family Kiwifruit, has young twigs with white tomentum, with papery and obovate leaves, cymes, as well as small and ovate flower segments. The fruit is yellow-brown, spherical or obovate. For some areas with frequent cold in spring and insufficient light, a light supplement device is needed to supplement the light quantum needed in the growth of kiwifruit.

For example, Chinese patent No. 209371079U discloses "a kiwifruit light supplement lamp", the lamp includes a lamp body and a finishing device. An upper end of the lamp body is provided with a lamp frame, and a front end of the lamp frame is provided with a light emitting diode (LED) lamp group. An outer side of a rear end of the lamp frame is connected with a mounting box plate, and a lower end of a middle part of the mounting box plate is provided with a rotary adjustment mechanism, and the finishing device is connected with an inner side of a top end of the rotary adjustment mechanism. The kiwifruit light supplement lamp is provided with an upper rod and a lower rod.

However, in the prior art, when the light supplement device is used to supplement the light quantum number for a long time, serious heating will occur with the long-term use of the light supplement device by kiwifruit. Moreover, during use, due to the influence of kiwifruit planting environment, dust will accumulate on the surface of the light supplement device, and even dust will enter the inside of the light supplement device, thus affecting the heat dissipation of the light supplement device and further aggravating the heat generation of the light supplement device.

SUMMARY

An objective of the disclosure is to provide a precise light supplement device for kiwifruits, so as to solve the problem in the prior art that when the light supplement device is used to supplement the light quantum number for a long time, serious heating will occur with the use of the light supplement device for kiwifruit. And during use, due to the influence of kiwifruit planting environment, dust will accumulate on the surface of the light supplement device, and even dust will enter the inside of the light supplement device, thus affecting the heat dissipation of the light supplement device and further aggravating the heat generation of the light supplement device.

In order to achieve the above objective, the disclosure provides a following technical solution. The precise light supplement device for kiwifruits includes a support table and a light supplement lamp body, and an angle adjusting mechanism is mounted on a top of the support table, and a top of the angle adjusting mechanism is connected to a bottom of the light supplement lamp body; a fixing frame is fixedly mounted on a top of the light supplement lamp body, and a mounting plate is fixedly connected to one side of the fixing frame, and a movable mechanism is arranged at one side of the light supplement lamp body, and a driving mechanism is arranged at one side of the mounting plate.

The movable mechanism includes a rotating disc and a reciprocating frame, a rotating rod is rotatably mounted on one side of the rotating disc, and one end of the rotating rod is fixedly connected with a push rod; the push rod is slidably arranged in the reciprocating frame, each of two sides of the reciprocating frame is fixedly connected with a limiting rod, a limiting frame is slidably mounted on a surface of the limiting rod, and one end of the limiting frame is fixedly connected to the mounting plate; a reciprocating rod is fixedly connected to a bottom of the reciprocating frame, a mounting rod is fixedly mounted on a bottom of the reciprocating rod, and a cleaning brush is mounted on one side of the mounting rod.

The driving mechanism includes a driving wheel and a driven wheel, a driving motor is mounted on the one side of the mounting plate, and an output end of the driving motor is fixedly connected to the driving wheel; a synchronous belt is sleeved on a surface of the driving wheel, and one end of the synchronous belt is sleeved on the driven wheel.

In some embodiments, the rotating disc is rotatably mounted on another side of the mounting plate, and a shaft end of the rotating disc is fixedly connected to the driving wheel.

In some embodiments, the one side of the light supplement lamp body is provided with a heat dissipation port, a dustproof net is mounted in the heat dissipation port, and the dustproof net abuts against the cleaning brush.

In some embodiments, a top end of the one side of the light supplement lamp body is provided with a guide groove, a guide block is slidably mounted in the guide groove, and one end of the guide block is fixedly connected to the reciprocating rod.

In some embodiments, a first mounting frame is fixedly mounted on the one side of the light supplement lamp body, and a fan is rotatably mounted on one side of the first mounting frame.

In some embodiments, one end of the driving wheel is rotatably connected to the mounting plate, and a shaft end of the fan is fixedly connected to a shaft end of the driven wheel.

In some embodiments, the angle adjusting mechanism includes a second mounting frame and a moving block, each of two sides of the second mounting frame is provided with a limiting hole, and a moving rod is fixedly mounted on each of two ends of the moving block; one end of the moving rod is slidably mounted in the limiting hole, a movable rod is rotatably mounted on a surface of the one end of the moving rod, and one end of the movable rod is rotatably connected with a connecting frame; and the connecting frame is fixedly connected to a side wall of the light supplement lamp body.

In some embodiments, two sides of the bottom of the light supplement lamp body are fixedly connected with rotating sleeves respectively, rotating frames are fixedly mounted on one side of the top of the support table, and each of the rotating sleeves is movably connected to a corresponding one of the rotating frames.

In some embodiments, one side of the second mounting frame is provided with an adjusting rod through threads, and one end of the adjusting rod is fixedly connected to the moving block.

In some embodiments, the one end of the moving rod is fixedly connected with a baffle, and a diameter of the baffle is larger than a longitudinal width of the limiting hole.

Compared with the prior art, the disclosure has following beneficial effects.

Firstly, in the disclosure, the fan is controlled to rotate by the driving motor, the driving wheel, the driven wheel and the synchronous belt, so as to improve the heat dissipation effect of the light supplement lamp body and avoid the damage of the internal LED lamp tubes or the reduction of the service life caused by serious heat generation. Additionally, as the fan rotates to assist in heat dissipation of the light supplement lamp body, the cleaning brush mounted on the one side of the mounting rod is controlled to start reciprocating motion through the rotating disc, the rotating rod, the reciprocating rod, the reciprocating frame and the push rod, so that the surface of the dustproof net may be cleaned and the normal heat dissipation function of the light supplement lamp body may be prevented from being affected by dust accumulation.

Secondly, in the disclosure, during the movement of the reciprocating rod, the guide block connected to the side of the reciprocation rod slides in the guide groove, so that the movement track of the reciprocating rod may be limited, and the reciprocating rod may be guaranteed not to be skewed and offset during the reciprocating movement, so as to avoid the cleaning brush from being skewed and unable to clean the dustproof net normally, and ensure the normal cleaning operation of the cleaning brush.

Thirdly, in the disclosure, the movement of the light supplement lamp body may be controlled by the adjusting rod, the moving block, the moving rod, the limiting hole and the movable rod, so that the light supplement lamp body moves in an arc shape about an axis of the rotating sleeve as a center of a circle. And an angle of the light supplement lamp body changes with the movement of the adjusting rod, so that a light supplement angle of the light supplement lamp body may be conveniently adjusted, and the precise light supplement of the light supplement lamp body may be further ensured.

DETAILED DESCRIPTION OF THE EMBODIMENTS

In the following, the technical solutions in the embodiments of the disclosure will be clearly and completely described with reference to the attached drawings. Apparently, the described implementations are only part of the embodiments of the disclosure, but not all the embodiments. Based on the embodiments in the disclosure, all other embodiments obtained by those skilled in the art without creative effort belong to the protection scope of the disclosure.

Embodiment 1

With reference to FIG. 1 to FIG. 16, a precise light supplement device for kiwifruits includes a support table 6 and a light supplement lamp body 1. An angle adjusting mechanism 5 is mounted on a top of the support table 6, and a top of the angle adjusting mechanism 5 is connected to a bottom of the light supplement lamp body 1. A fixing frame 3 is fixedly mounted on a top of the light supplement lamp body 1, and a mounting plate 31 is fixedly connected to one side of the fixing frame 3. A movable mechanism 2 is arranged at one side of the light supplement lamp body 1, and a driving mechanism 4 is arranged at one side of the mounting plate 31.

Figure 3:
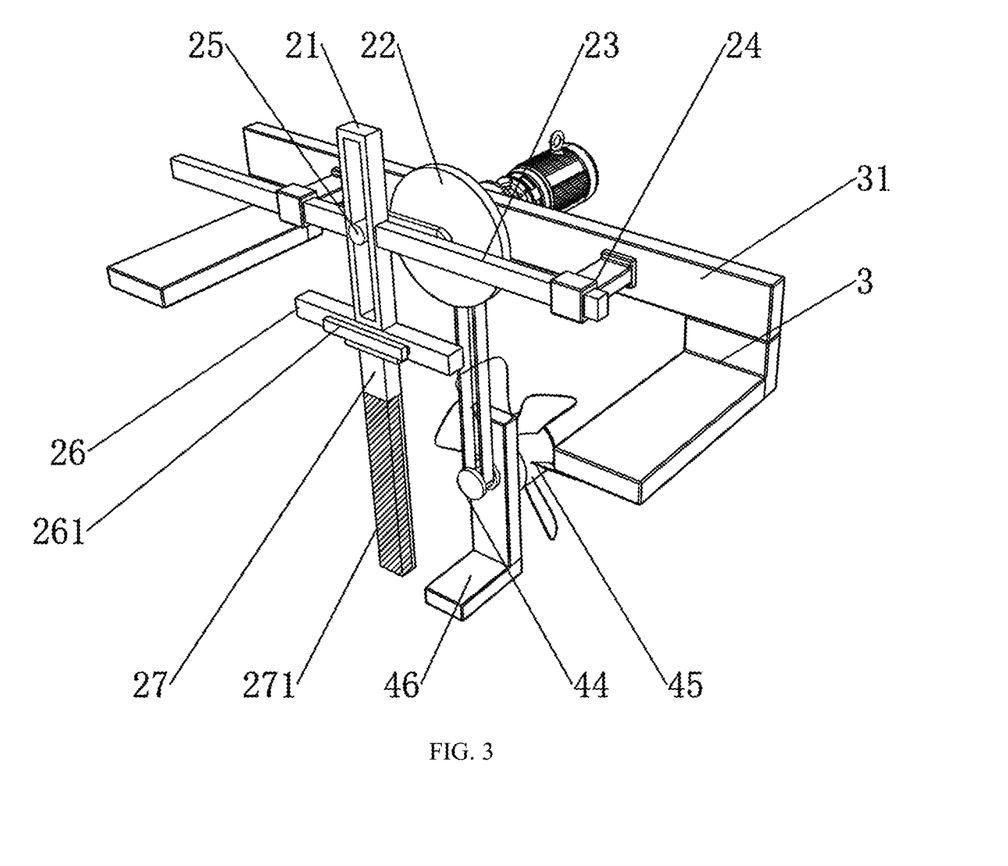
FIG. 3 is a schematic structural diagram of a movable mechanism of the precise light supplement device for kiwifruits according to the disclosure.
Figure 4:
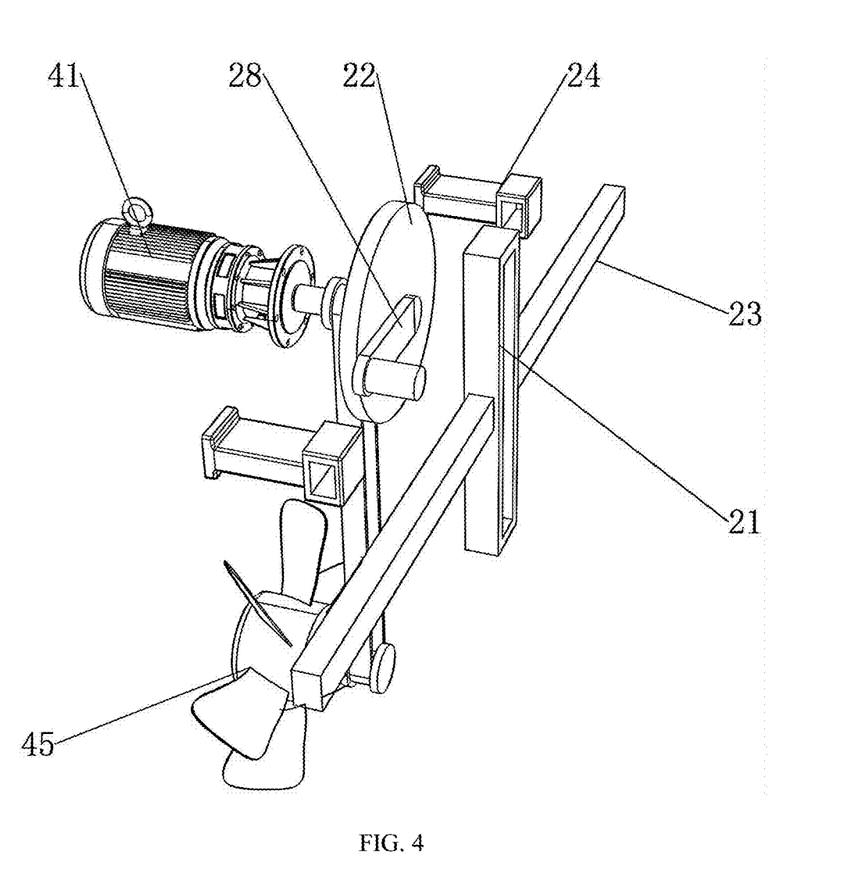
FIG. 4 is a schematic diagram of a partially disassembled structure of the movable mechanism of the precise light supplement device for kiwifruits according to the disclosure.
Figure 5:
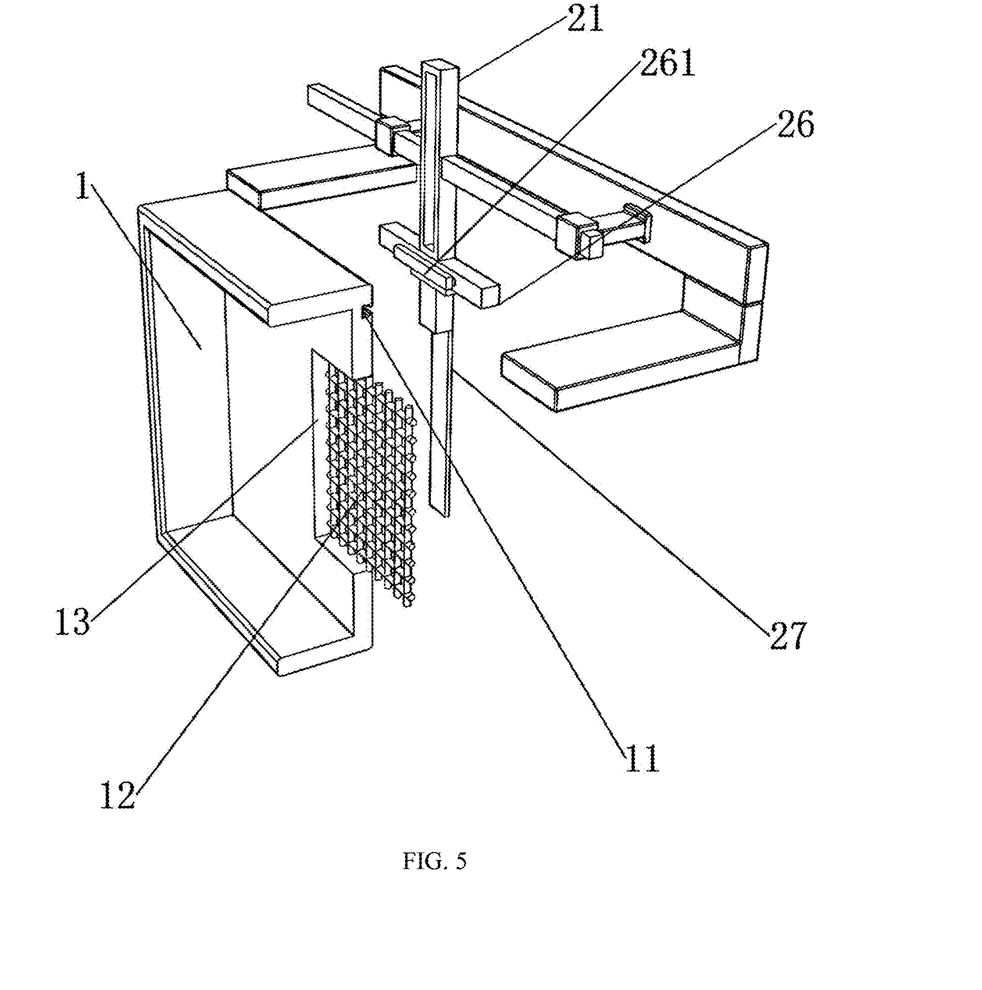
FIG. 5 is a schematic sectional view of a shell of a light supplement lamp body of the precise light supplement device for kiwifruits according to the disclosure.

The movable mechanism 2 includes a rotating disc 22 and a reciprocating frame 21. A rotating rod 28 is rotatably mounted on one side of the rotating disc 22, and one end of the rotating rod 28 is fixedly connected with a push rod 25. The push rod 25 is slidably arranged in the reciprocating frame 21, a limiting rod 23 is fixedly connected to each of two sides of the reciprocating frame 21, a limiting frame 24 is slidably mounted on a surface of the limiting rod 23, and one end of the limiting frame 24 is fixedly connected to the mounting plate 31. A reciprocating rod 26 is fixedly connected to a bottom of the reciprocating frame 21, a mounting rod 27 is fixedly mounted on a bottom of the reciprocating rod 26, and a cleaning brush 271 is mounted on one side of the mounting rod 27.

Figure 6:
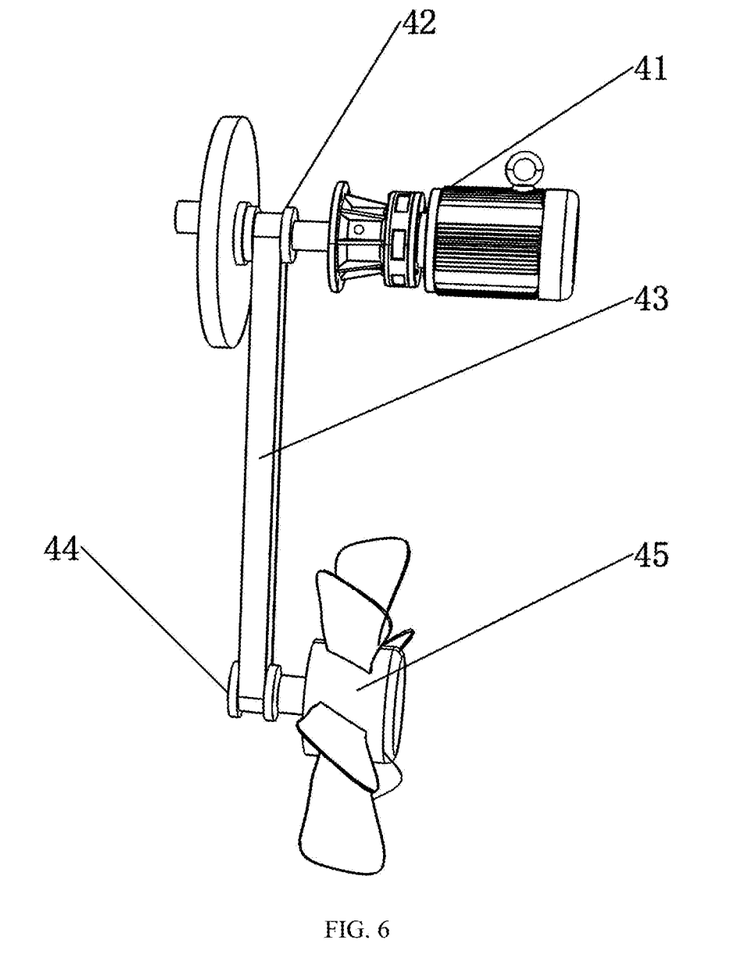
FIG. 6 is a schematic structural diagram of a driving mechanism of the precise light supplement device for kiwifruits according to the disclosure.

Further, the driving mechanism 4 includes a driving wheel 42 and a driven wheel 44. A driving motor 41 is mounted on one side of the mounting plate 31, and an output end of the driving motor 41 is fixedly connected to the driving wheel 42. A synchronous belt 43 is sleeved on a surface of the driving wheel 42, and one end of the synchronous belt 43 is sleeved on the driven wheel 44.

In this embodiment, internal lamp tubes and parts may generate heat after the light supplement work of the light supplement lamp body 1 is carried out for a long time. At this time, the driving motor 41 may drive the driving wheel 42 to rotate, and the driving wheel 42 may simultaneously drive the synchronous belt 43 to start moving, so that the driven wheel 44 may also rotate together to drive fan 45 to start rotating, thereby driving the airflow to flow, and conveying the external cold air to the light supplement lamp body 1 through a heat dissipation port 13 to assist the light supplement lamp body 1 to dissipate heat. Another side of the light supplement lamp body 1 is provided with air guide holes to assist the air circulation inside the light supplement lamp body 1, thereby forming an airflow path, further improving the heat dissipation effect of the light supplement lamp body 1, and preventing the internal LED lamp tubes from being damaged or the service life from being shortened due to serious heating.

With a long-term operation of the fan 45, the airflow path formed within the light supplement lamp body 1 also affects the external air velocity, which may further assist kiwifruit pollination. In addition, in this process, the dust in the air may be blocked by a dustproof net 12, thus accumulating on a surface of the dustproof net 12.

When the driving wheel 42 rotates, the rotating disc 22 is similarly driven to rotate. At this time, a rotating plate on the surface of the rotating disc 22 starts to rotate together with the rotating disc 22, and because one end of the rotating plate is connected with the shaft end of the rotating disc 22, so that the other end of the rotating plate, that is, one end provided with the push rod 25 starts to move in a circular motion. Therefore, during the rotation of the rotating disc 22, the push rod 25 starts to move in a circular motion around the shaft end of the rotating disc 22. Because the push rod 25 is slidably mounted in the reciprocating frame 21, the push rod 25 may drive the reciprocating rod 26 to move during the movement. The reciprocating rod 26 also drives the limiting rods 23 respectively connected to the two sides thereof to move during the movement. Because the limiting rod 23 may be limited by the limiting frame 24 during the movement, the limiting rod 23 may only move horizontally and linearly, so that the reciprocating frame 21 may also move in the same trajectory. Therefore, when the push rod 25 moves in a circular motion, the reciprocating frame 21 may drive the reciprocating rod 26 and the limiting rod 23 to reciprocate together. At this time, the mounting rod 27 connected to the bottom of the reciprocating rod 26 may move together with the cleaning brush 271, so that the cleaning brush 271 may clean the dustproof net 12, so as to avoid dust accumulation on the surface of the dustproof net 12 as well as avoid affecting the normal heat dissipation function of the light supplement lamp body 1.

When the driving motor 41, the driving wheel 42, the driven wheel 44 and the synchronous belt 43 are used to control the fan 45 to rotate to assist the heat dissipation of the light supplement lamp body 1, the cleaning brush 271 mounted on the side of the mounting rod 27 may be controlled to start reciprocating motion through the rotating disc 22, the rotating rod 28, the reciprocating rod 26, the reciprocating frame 21 and the push rod 25, so that the surface of the dustproof net 12 may be cleaned and the normal heat dissipation function of the light supplement lamp body 1 may be prevented from being affected by dust accumulation.

Embodiment 2

As shown in FIG. 3, FIG. 4 and FIG. 6, the rotating disc 22 is rotatably mounted the other side of the mounting plate 31, and the shaft end of the rotating disc 22 is fixedly connected to the driving wheel 42. One side of the light supplement lamp body 1 is provided with the heat dissipation port 13, and the dustproof net 12 is mounted in the heat dissipation port 13, and the dustproof net 12 abuts against the cleaning brush 271. A guide groove 11 is formed in the top end of the one side of the light supplement lamp body 1, and a guide block 261 is slidably mounted in the guide groove 11, and one end of the guide block 261 is fixedly connected to the reciprocating rod 26. A first mounting frame 46 is fixedly mounted on the one side of the light supplement lamp body 1, and the fan 45 with blades is rotatably mounted on one side of the first mounting frame 46. One end of the driving wheel 42 is rotatably connected to the mounting plate 31, and the shaft end of the fan 45 is fixedly connected with the shaft end of the driven wheel 44.

In this embodiment, with the long-term operation of the fan 45, the airflow path formed within the light supplement lamp body 1 also affects the external air flow speed, thus assisting kiwifruit pollination. In addition, in this process, the dust in the air may be blocked by the dustproof net 12, thus accumulating on the surface of the dustproof net 12.

During the movement of the reciprocating rod 26, the guide block 261 connected to one side thereof may slide in the guide groove 11, so as to limit the movement track of the reciprocating rod 26 and ensure that the reciprocating rod 26 may not be skewed and offset during the reciprocating movement, thus preventing the cleaning brush 271 from being skewed and unable to clean the dustproof net 12 normally, and ensuring the normal cleaning operation of the cleaning brush 271.

Embodiment 3

Figure 1:
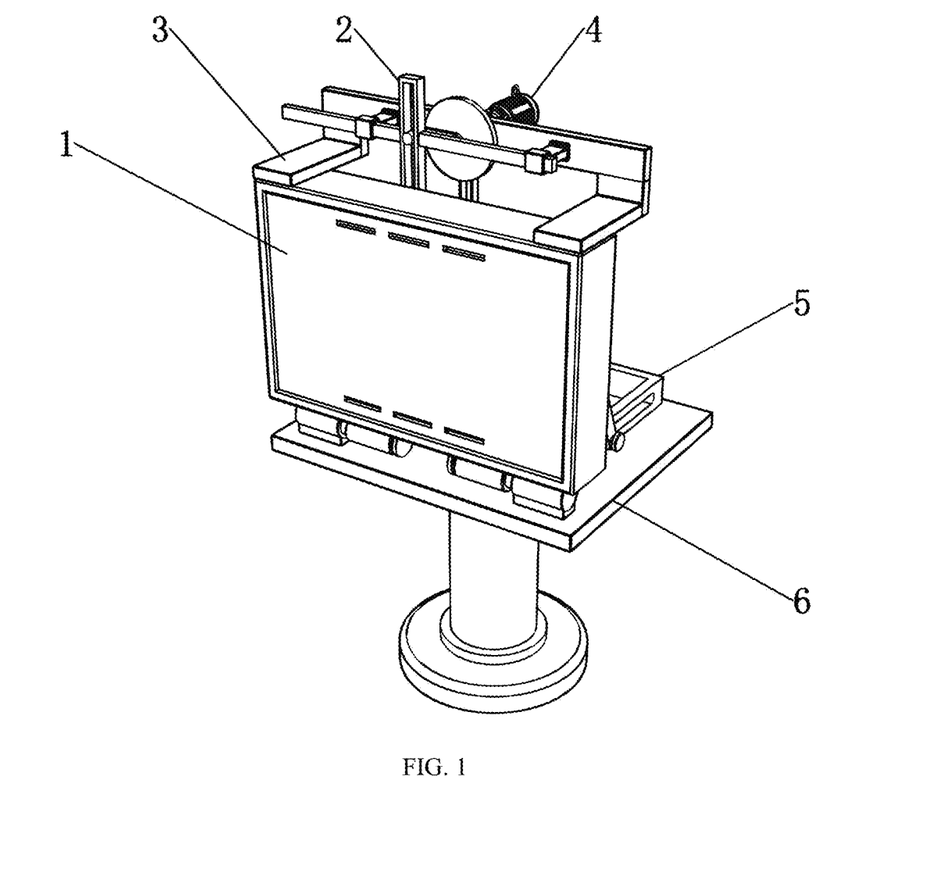
FIG. 1 is a schematic three-dimensional structural diagram of a precise light supplement device for kiwifruits according to the disclosure.
Figure 2:
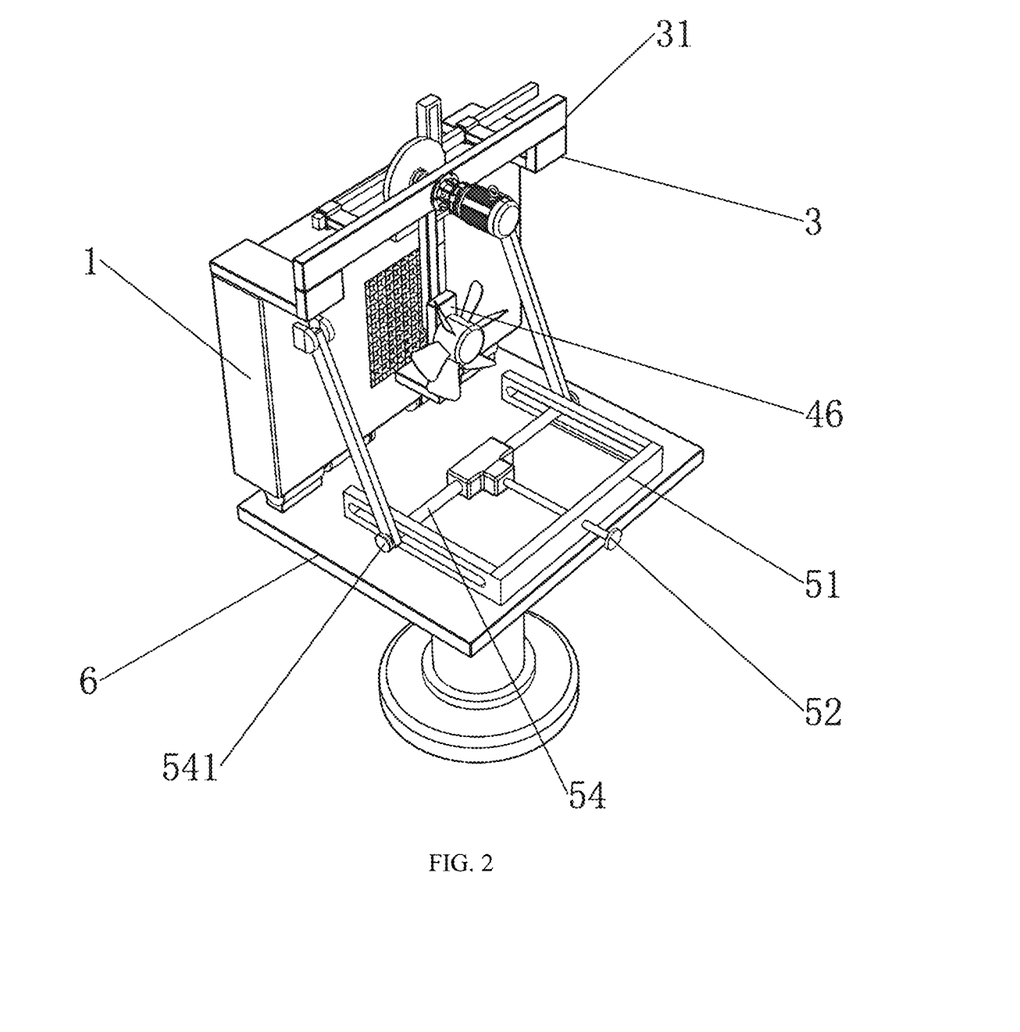
FIG. 2 is a schematic rear-view structural diagram of the precise light supplement device for kiwifruits according to the disclosure.
Figure 7:
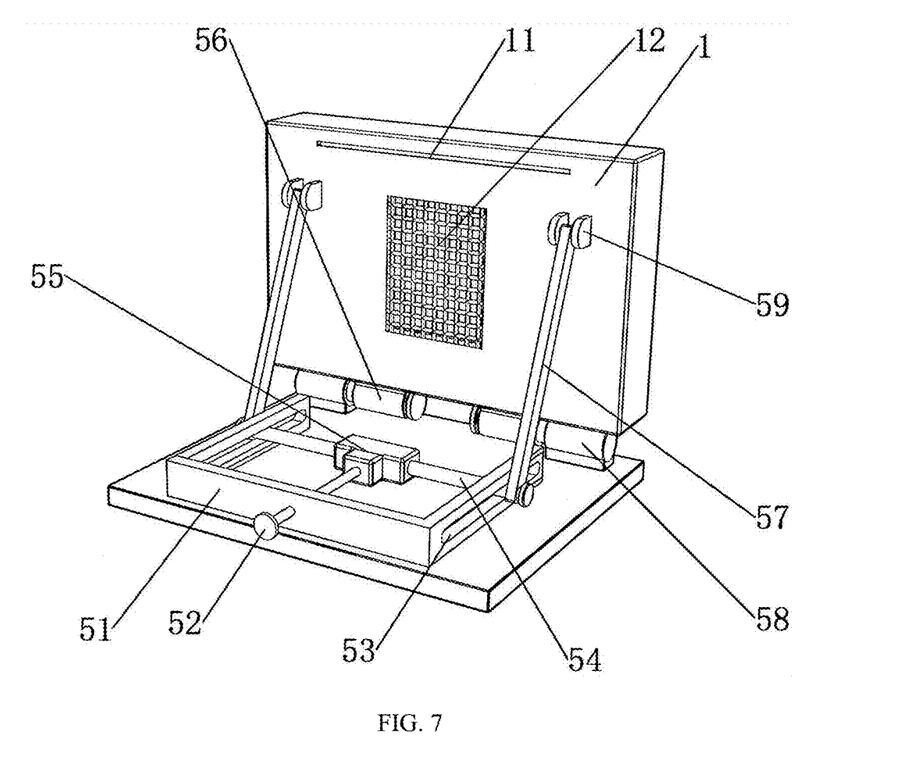
FIG. 7 is a schematic structural diagram of an angle adjusting mechanism of the precise light supplement device for kiwifruits according to the disclosure.

As shown in FIG. 2 and FIG. 7, the angle adjusting mechanism 5 includes a second mounting frame 51 and a moving block 55. Limiting holes 53 are respectively formed in two sides of the second mounting frame 51. Moving rods 54 are fixedly mounted on two ends of the moving block 55 respectively. One end of the moving rod 54 is slidably mounted in the limiting hole 53, and a movable rod 57 is rotatably mounted on a surface of the end of the moving rod 54, and one end of the movable rod 57 is rotatably connected with a connecting frame 59. The connecting frame 59 is fixedly connected to the side wall of the light supplement lamp body 1. Two sides of the bottom of the light supplement lamp body 1 are fixedly connected with rotating sleeves 56 respectively, and rotating frames 58 are fixedly mounted on one side of the top of the support table 6. The rotating sleeve 56 is movably connected to the rotating frame 58. One side of the second mounting frame 51 is provided with an adjusting rod 52 through threads, and one end of the adjusting rod 52 is fixedly connected to the moving block 55. The one end of the moving rod 54 is fixedly connected with a baffle 541, and the diameter of the baffle 541 is larger than the longitudinal width of the limiting hole 53.

In this embodiment, when the adjusting rod 52 is controlled to rotate, the moving block 55 is controlled to move. At this time, the moving block 55 also moves together with the moving rods 54, and the moving rods 54 slide in the limiting holes 53 on the two sides of the second mounting frame 51 respectively. At this time, with the movement of the moving rods 54, the movable rods 57 move together, and then an angle of the light supplement lamp body 1 may be controlled in cooperation with the connecting frames 59. Therefore, with the movement of the moving rods 54, the light supplement lamp body 1 moves under the cooperation of the rotating sleeves 56 and the rotating frames 58, so that the light supplement lamp body 1 moves in an arc shape about an axis of the rotating sleeve 56 as a center of a circle. Further, with the movement of the adjusting rod 52, the angle of the light supplement lamp body 1 changes, so as to facilitate the adjustment of the light supplement angle of the light supplement lamp body 1 and further ensure the precise light supplement of the light supplement lamp body 1.

A use method and a working principle of the device are as follows. When the light supplement lamp body 1 is turned on, sufficient light may be provided to supplement the light to the kiwifruits, so as to improve the yield of the kiwifruits and reduce the incidence of the kiwifruits, and the light quantum number is supplemented by the light supplement lamp body 1 to ensure the light quantum supplementary dose of kiwifruit under the condition of the maximum net photosynthetic rate. On this basis, the airflow speed may be controlled by the fan to assist pollination and improve the fruit setting rate.

When the adjusting rod 52 is controlled to rotate, the moving block 55 is controlled to move. At this time, the moving block 55 also moves together with the moving rods 54, and the moving rods 54 respectively slide in the limiting holes 53 on the two sides of the second mounting frame 51. At this time, with the movement of the moving rods 54, the movable rods 57 move together, and then the angle of the light supplement lamp body 1 may be controlled in cooperation with the connecting frames 59. Therefore, with the movement of the moving rods 54, the light supplement lamp body 1 moves under the cooperation of the rotating sleeves 56 and the rotating frames 58, so that the light supplement lamp body 1 rotates about the axis of the rotating sleeve 56. Therefore, with the movement of the adjusting rod 52, the angle of the light supplement lamp body 1 changes, so as to facilitate the adjustment of the light supplement angle of the light supplement lamp body 1.

The internal lamp tubes and parts may generate heat after the light supplement work of the light supplement lamp body 1 is carried out for a long time. At this time, the driving motor 41 may drive the driving wheel 42 to rotate, and the driving wheel 42 may simultaneously drive the synchronous belt 43 to start moving, so that the driven wheel 44 may also rotate together to drive fan 45 to start rotating, thereby driving the airflow to flow, and conveying the external cold air to the light supplement lamp body 1 through the heat dissipation port 13 to assist the light supplement lamp body 1 to dissipate heat. The other side of the light supplement lamp body 1 is provided with the air guide holes to assist the air circulation inside the light supplement lamp body 1, thereby forming the airflow path, further improving the heat dissipation effect of the light supplement lamp body 1.

When the driving wheel 42 rotates, the rotating disc 22 is similarly driven to rotate. At this time, the rotating plate on the surface of the rotating disc 22 starts to rotate together with the rotating disc 22, and because one end of the rotating plate is connected with the shaft end of the rotating disc 22, so that the other end of the rotating plate, that is, one end provided with the push rod 25 starts to move in the circular motion. Therefore, during the rotation of the rotating disc 22, the push rod 25 starts to move in the circular motion around the shaft end of the rotating disc 22. Because the push rod 25 is slidably mounted in the reciprocating frame 21, the push rod 25 may drive the reciprocating rod 26 to move during the movement. The reciprocating rod 26 also drives the limiting rods 23 respectively connected to the two sides to move during the movement. Because the limiting rod 23 may be limited by the limiting frame 24 during the movement, the limiting rod 23 may only move horizontally and linearly, so that the reciprocating frame 21 may also move in the same trajectory. Therefore, when the push rod 25 moves in the circular motion, the reciprocating frame 21 may drive the reciprocating rod 26 and the limiting rod 23 to reciprocate together. At this time, the mounting rod 27 connected to the bottom of the reciprocating rod 26 may move together with the cleaning brush 271, so that the cleaning brush 271 may clean the dustproof net 12, and the normal heat dissipation of the light supplement lamp body 1 may be prevented from being affected by dust accumulation on the surface of the dustproof net 12.

Although the disclosure has been described in detail with reference to the foregoing embodiments, it is still possible for a person skilled in the art to modify the technical solution described in the foregoing embodiments or to replace some technical features by equivalents. Any modification, equivalent replacement, improvement, etc. made within the spirit and principle of the disclosure should be included in the protection scope of the disclosure.

What is claimed is:

1. A precise light supplement device for kiwifruits, comprising: a support table and a light supplement lamp body, wherein an angle adjusting mechanism is mounted on a top of the support table, and a top of the angle adjusting mechanism is connected to a bottom of the light supplement lamp body; a fixing frame is fixedly mounted on a top of the light supplement lamp body, and a mounting plate is fixedly connected to one side of the fixing frame, wherein a movable mechanism is arranged at one side of the light supplement lamp body, and a driving mechanism is arranged at one side of the mounting plate;

wherein the movable mechanism comprises a rotating disc and a reciprocating frame, a rotating rod is rotatably mounted on one side of the rotating disc, and one end of the rotating rod is fixedly connected with a push rod; the push rod is slidably arranged in the reciprocating frame, each of two sides of the reciprocating frame is fixedly connected with a limiting rod, a limiting frame is slidably mounted on a surface of the limiting rod, and one end of the limiting frame is fixedly connected to the mounting plate; a reciprocating rod is fixedly connected to a bottom of the reciprocating frame, a mounting rod is fixedly mounted on a bottom of the reciprocating rod, and a cleaning brush is mounted on one side of the mounting rod; and wherein the driving mechanism comprises a driving wheel and a driven wheel, a driving motor is mounted on the one side of the mounting plate, and an output end of the driving motor is fixedly connected to the driving wheel; a synchronous belt is sleeved on a surface of the driving wheel, and one end of the synchronous belt is sleeved on the driven wheel.

2. The precise light supplement device for kiwifruits according to claim 1, wherein the rotating disc is rotatably mounted on an other side of the mounting plate, and a shaft end of the rotating disc is fixedly connected to the driving wheel.

3. The precise light supplement device for kiwifruits according to claim 2, wherein a top end of the one side of the light supplement lamp body is provided with a guide groove, a guide block is slidably mounted in the guide groove, and one end of the guide block is fixedly connected to the reciprocating rod.

4. The precise light supplement device for kiwifruits according to claim 3, wherein a first mounting frame is fixedly mounted on the one side of the light supplement lamp body, and a fan is rotatably mounted on one side of the first mounting frame.

5. The precise light supplement device for kiwifruits according to claim 4, wherein one end of the driving wheel is rotatably connected to the mounting plate, and a shaft end of the fan is fixedly connected to a shaft end of the driven wheel.

6. The precise light supplement device for kiwifruits according to claim 1, wherein the one side of the light supplement lamp body is provided with a heat dissipation port, a dustproof net is mounted in the heat dissipation port, and the dustproof net abuts against the cleaning brush.

7. The precise light supplement device for kiwifruits according to claim 1, wherein the angle adjusting mechanism comprises a second mounting frame and a moving block, each of two sides of the second mounting frame is provided with a limiting hole, and a moving rod is fixedly mounted on each of two ends of the moving block; one end of the moving rod is slidably mounted in the limiting hole, a movable rod is rotatably mounted on a surface of the one end of the moving rod, and one end of the movable rod is rotatably connected with a connecting frame; and the connecting frame is fixedly connected to a side wall of the light supplement lamp body.

8. The precise light supplement device for kiwifruits according to claim 7, wherein two sides of the bottom of the light supplement lamp body are fixedly connected with rotating sleeves respectively, rotating frames are fixedly mounted on one side of the top of the support table, and each of the rotating sleeves is movably connected to a corresponding one of the rotating frames.

9. The precise light supplement device for kiwifruits according to claim 8, wherein one side of the second mounting frame is provided with an adjusting rod through threads, and one end of the adjusting rod is fixedly connected to the moving block.

10. The precise light supplement device for kiwifruits according to claim 8, wherein the one end of the moving rod is fixedly connected with a baffle, and a diameter of the baffle is larger than a longitudinal width of the limiting hole.

* * * * *